US011898658B1

(12) United States Patent
Vlassoff

(10) Patent No.: US 11,898,658 B1
(45) Date of Patent: Feb. 13, 2024

(54) HEATING A VALVE BODY

(71) Applicant: Dresser, LLC, Houston, TX (US)

(72) Inventor: Cyril Nicolas Vlassoff, Saint-Georges des Groseillers (FR)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 17/976,922

(22) Filed: Oct. 31, 2022

(51) Int. Cl.
*F16K 49/00* (2006.01)

(52) U.S. Cl.
CPC .......... *F16K 49/007* (2013.01); *F16K 49/005* (2013.01); *Y10T 137/6579* (2015.04)

(58) Field of Classification Search
CPC . F16K 49/005; F16K 49/007; Y10T 137/6579
See application file for complete search history.

(56) References Cited

U.S. PATENT DOCUMENTS

| | | | | |
|---|---|---|---|---|
| 1,535,212 A | * | 4/1925 | Egloff | F16K 49/007 |
| | | | | 137/340 |
| 3,973,585 A | * | 8/1976 | Henderson | F16L 53/32 |
| | | | | 137/340 |
| 4,292,992 A | * | 10/1981 | Bhide' | F16K 25/02 |
| | | | | 137/340 |
| 4,556,082 A | | 12/1985 | Riley et al. | |
| 4,583,570 A | * | 4/1986 | Rabe | F16K 5/06 |
| | | | | 137/340 |
| 9,062,636 B2 | * | 6/2015 | Nishimori | F02M 26/58 |
| 9,803,303 B2 | | 10/2017 | Sheehan | |
| 10,054,236 B2 | * | 8/2018 | Smith | F16K 17/18 |
| 2017/0016782 A1 | | 1/2017 | Thayer et al. | |
| 2020/0217433 A1 | * | 7/2020 | Gabriel | F16K 3/246 |

FOREIGN PATENT DOCUMENTS

DE 2832505 A1 * 2/1980 ........... F16K 49/005

OTHER PUBLICATIONS

Machine translation of DE 2832505.*

* cited by examiner

*Primary Examiner* — Kevin F Murphy
(74) *Attorney, Agent, or Firm* — Paul Frank + Collins P.C.

(57) ABSTRACT

A valve housing is configured to maintain temperature of a valve. These configurations may incorporate paths or channels in structure of the valve that carry working fluid. Heating fluid, like steam or hot water, may flow through these paths to heat this structure. This feature can maintain or raise temperature of the working fluid to meet specifications, standards, or process parameters. In one implementation, the paths may have complex routes or geometry with curves, bends, or other feature that can maximize surface area that is available to distribute heat to the device. This geometry may require manufacturing techniques, like additive manufacturing, that can generate unitary or monolithic structures, particularly those structures that includes voids in the material to form the integral paths for the heating fluid.

20 Claims, 5 Drawing Sheets

HEATING A VALVE BODY

BACKGROUND

Flow controls play a significant role in many industrial settings. Power plants and industrial process facilities, for example, use different types of flow controls to manage flow of material, typically fluids, throughout vast networks of pipes, tanks, generators, and other equipment. Operators may require these flow controls to keep this material at certain temperatures. For example, some materials may need to flow at higher temperatures in order to avoid crystallization or to maintain lower fluid viscosity. One solution to address these requirements has been to wrap the flow controls in an outer layer of insulation or heated blanket. In some cases, manufacturers may include a metal cover that encases parts of the flow control. This "jacket" may couple with a system that distributes heating fluid to the device to maintain or raise temperature of the flow control.

SUMMARY

The subject matter of this disclosure relates to improvements to apply heat at or in proximity to material that flows through flow controls. Of particular interest are embodiments that can receive a flow of heating fluid. These embodiments may have a unitary body with integral channels for this flow. This design may lower costs because the flow control doesn't require any additional parts, like insulation, heated blankets, or jackets.

DRAWINGS

This specification refers to the following drawings.

Figure 1:
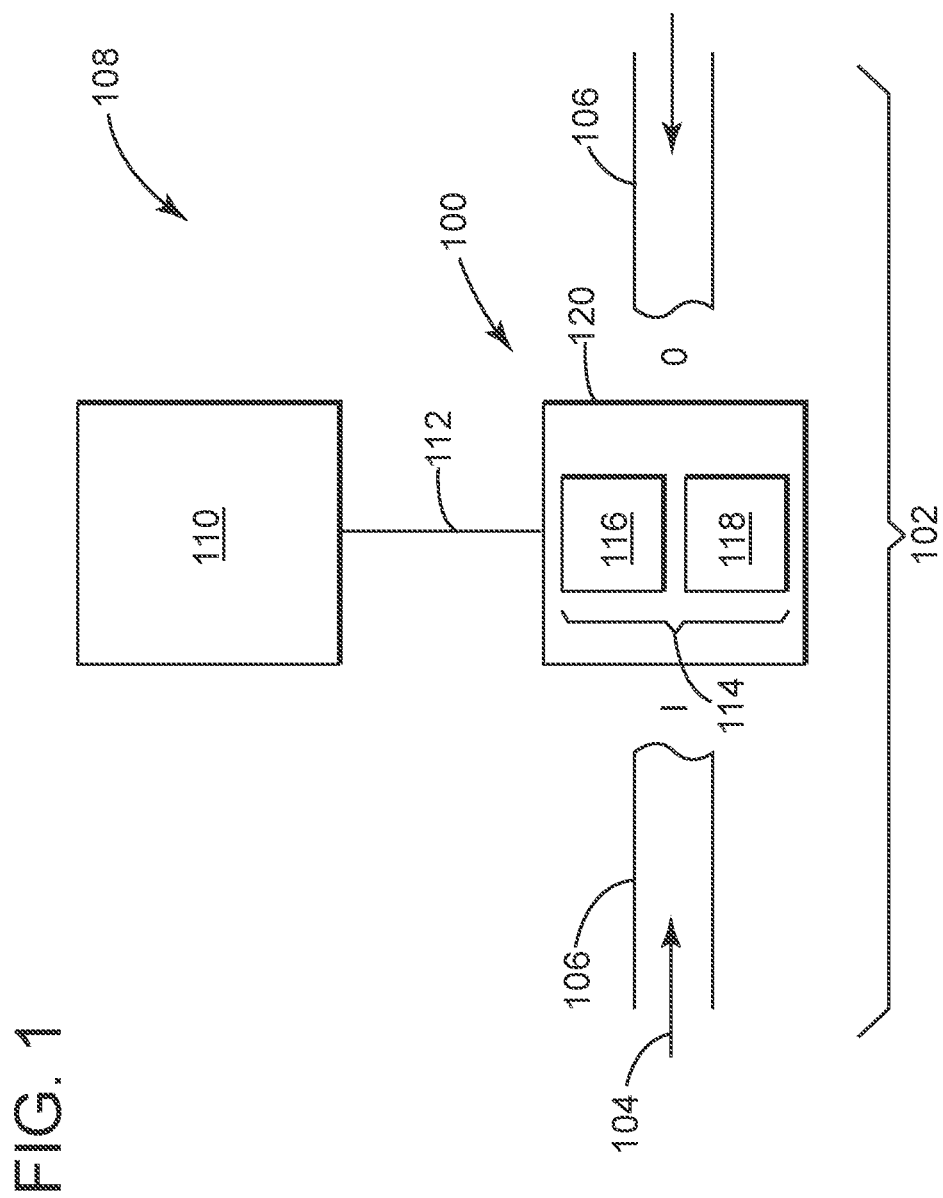
FIG. 1 depicts a schematic diagram of an exemplary embodiment of a valve housing.

These drawings and any description herein represent examples that may disclose or explain the invention. The examples include the best mode and enable any person skilled in the art to practice the invention, including making and using any devices or systems and performing any incorporated methods. The drawings are not to scale unless the discussion indicates otherwise. Elements in the examples may appear in one or more of the several views or in combinations of the several views. The drawings may use like reference characters to designate identical or corresponding elements. Methods are exemplary only and may be modified by, for example, reordering, adding, removing, and/or altering individual steps or stages. The specification may identify such stages, as well as any parts, components, elements, or functions, in the singular with the word "a" or "an;" however, this should not exclude plural of any such designation, unless the specification explicitly recites or explains such exclusion. Likewise, any references to "one embodiment" or "one implementation" should does not exclude the existence of additional embodiments or implementations that also incorporate the recited features.

DESCRIPTION

The discussion now turns to describe features of the examples shown in drawings noted above. These features provide operators with a cost-effective solution to maintain temperature of working fluids that flow through valves or other devices in their process lines. This solution may leverage designs that integrate complex flow paths into structure that carries the working fluids. These designs can make optimal use of available surface area, which helps to maintain or raise temperature of the working fluids to levels that satisfy operator requirements. Other embodiments are within the scope of this disclosure.

FIG. 1 depicts an example of a valve housing 100. This example is found in a distribution network 102, typically designed to carry material 104 through a network of conduit 106. The valve housing 100 may form part of a flow control 108 that is part of the network 102. The flow control 108 may have an actuator 110 and a valve stem 112 with an end that couples with valve mechanics 114, which may include a closure member 116 and a seat 118. In one implementation, the valve housing 100 may include a heating unit 120 that locates the valve mechanics 116, 118 in flow of fluid F.

Broadly, the valve housing 100 may be configured to generate heat. These configurations may include designs that flow fluids, like hot water or steam, throughout the device. The designs may utilize channels or pathways with complex geometry to maximize surface area. This geometry may form integrally with structure that supports other components, for example, components that regulate flow of fluids, including process material or resources, like oil or natural gas.

The distribution system 102 may be configured to deliver or move these fluids. These configurations may embody vast infrastructure. Material 104 may comprise gases, liquids, solid-liquid mixes, or liquid-gas mixes, as well. The conduit 106 may include pipes or pipelines, often that connect to pumps, boilers, and the like. The pipes may also connect to tanks or reservoirs. In many facilities, this equipment forms complex networks to execute a process, like refining raw materials or manufacturing an end product.

The flow control 108 may be configured to regulate flow of material 104 through the conduit 106 in these complex networks. These configurations may include control valves and like devices. The actuator 110 may use pressurized fluid (like air or natural gas) to generate a load. Often, the device may include a piston, spring (or springs), or a flexible diaphragm for this purpose. The valve stem 112 may direct this load to the closure member 116, typically a ball, a plug, or a disc. This feature may counter pressure of material 104 on an opposite side of the closure member 116 to maintain the closure member 116 in a desired position relative to the seat 118. This desired position or "set point" may correspond with flow parameters for the material 104 to meet process requirements or parameters.

The heating unit 120 may be configured to house the valve mechanics 116, 118. These configurations may include devices made of metal, which can be cast, forged, or machined. Additive manufacturing techniques (including 3-D printing) may prevail as well because these techniques offer flexibility to design and implement structure with unique or complex geometry. In one implementation, the devices may also include features that generate or impart heat into any adjacent structure. In one implementation, these features may circulate heating fluid, like hot water or steam, that transfers heat into structure of the flow control 108 (including the valve mechanics 116, 118).

Figure 2:
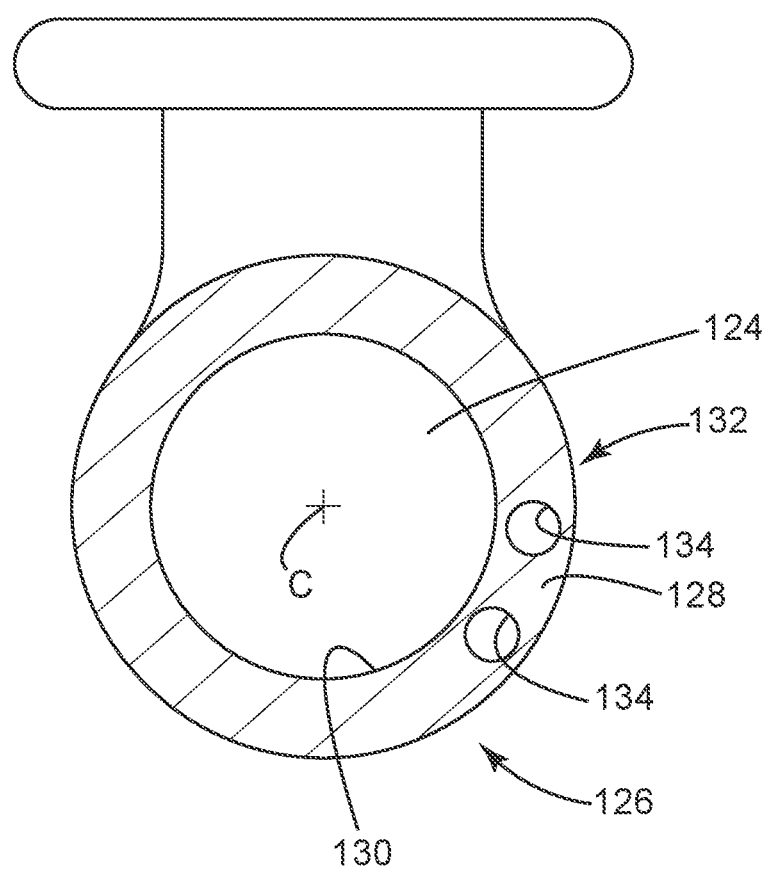
FIG. 2 depicts an elevation view of an example of the valve housing of FIG. 1.

FIG. 2 depicts an elevation view of the cross-section of an example of these heat-generating features. The heating unit 120 may form a valve body 122 with flanges at openings I, O. Adjacent pipes 106 may connect to these flanges. The valve body 122 may also have a main flow path 124. Material 104 may transit the main flow path 124 (from the inlet I to the outlet O) as per conventional use of the flow control 108 in the network 102. An outer wall structure 126 may bound at least part of the main flow path 124. The outer wall structure 126 may include a first wall 128, which may form an interior surface 130 of the main flow path 124. The first wall 128 may incorporate a secondary or "heating" flow path 132 that allows the heating fluid to flow into and throughout structure of the valve body 122. In one implementation, the heating flow path 132 may embody individual pathways 134 that are spaced apart from one another, for example, radially apart about a central axis C of the device. The pathways 134 may have a cross-section that is round; however, this disclosure contemplates that this cross-section may take on other shapes, like square or rectangular, as well. More complex geometry is possible, for example, with use of additive manufacturing because of its flexibility to make or deposit or "print" layers of material on top of one another according to defined patterns.

Figure 3:
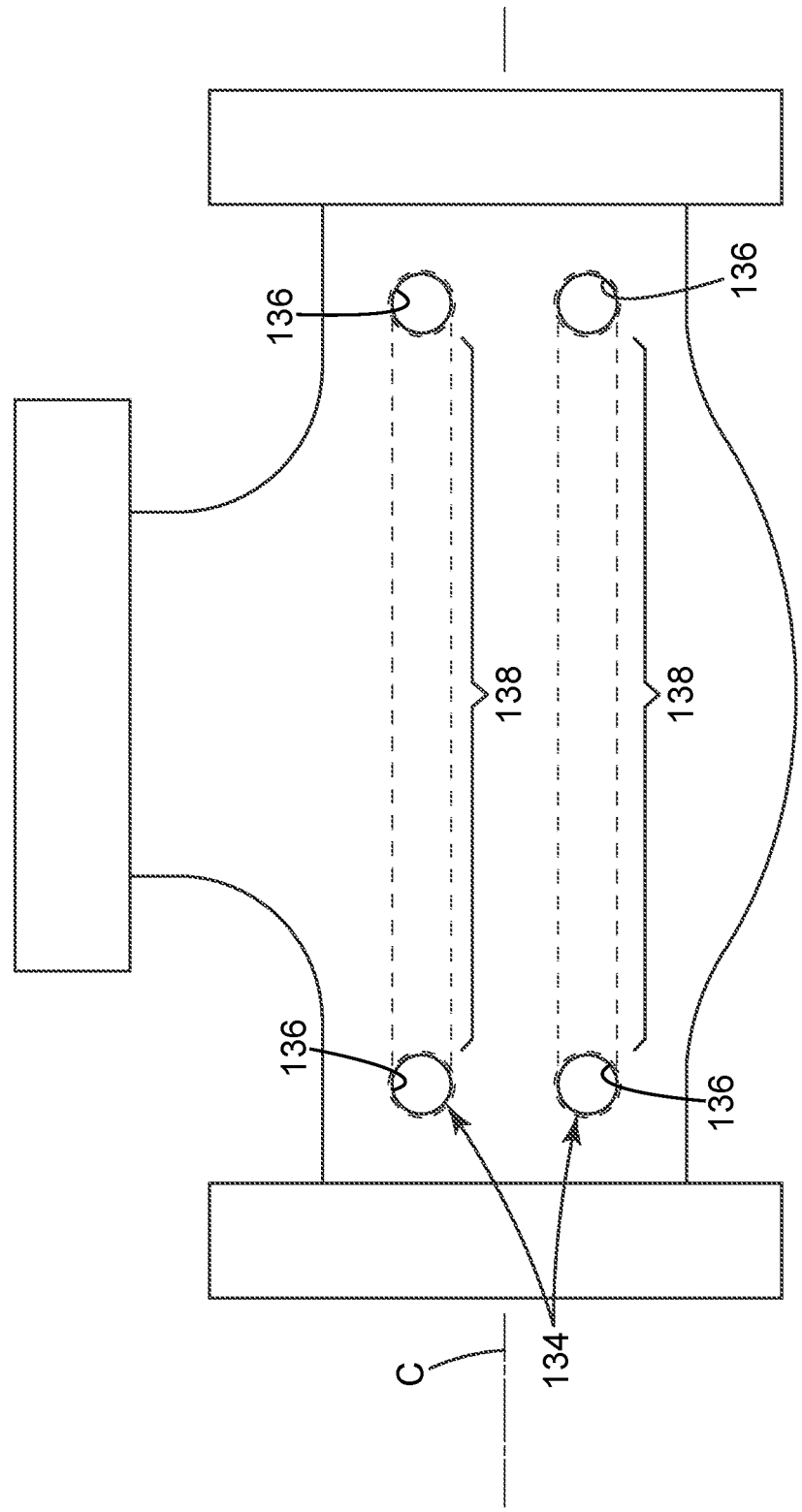
FIG. 3 depicts an elevation view of an example of the valve housing of FIG. 1.

FIG. 3 depicts an elevation view of the side of an example of the heating unit 120 of FIG. 2. The pathways 134 may terminate at ports 136, which may embody openings or holes with threads to receive complimentary fittings, as desired. This feature may allow operators to connect specific hoses or conduits that carry the heating fluid into and out of the pathways 134. The ports 136 may reside variously in the outer wall structure 126, for example, to provide access into a bore portion 138 of the pathways 134. This disclosure contemplates myriad geometry (including shapes, orientations, or curves) for the bore portion 138, including linear or non-linear arrangements that are available through use of additive manufacturing techniques. The linear arrangement in this example may extend generally longitudinally or axially along the central axis C. In both arrangements, the geometry may maximize surface area that is available to distribute heat to the device. This feature can optimally distribute the heating fluid to maintain or raise temperature of material 104 to meet specifications, standards, or process parameters.

Figure 4:
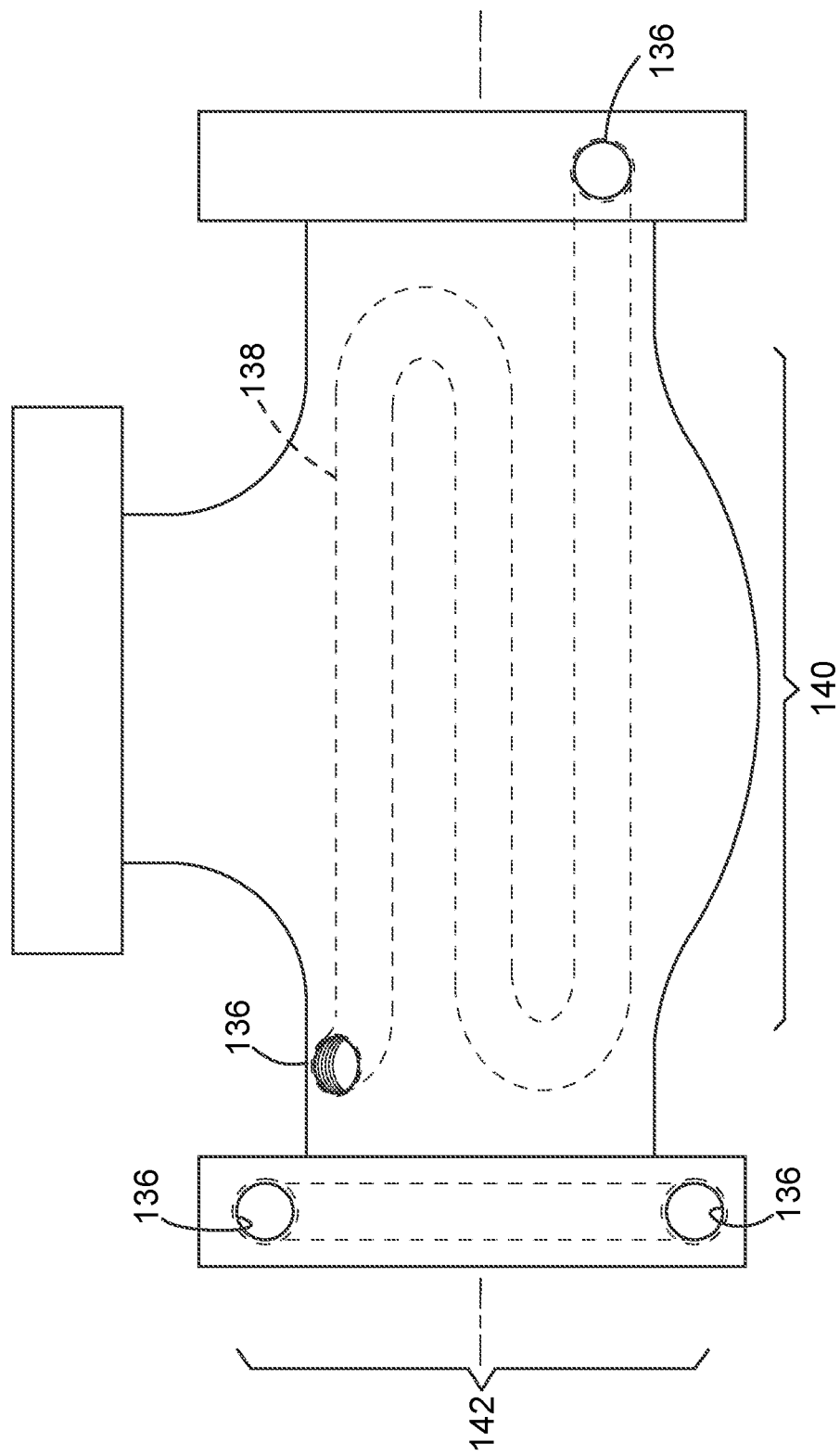
FIG. 4 depicts an elevation view of an example of the valve housing of FIG. 1.

FIG. 4 depicts an elevation view of the side of an example of the heating unit 120 of FIG. 2. The bore portion 138 may take on a circuitous route 140 that traverses variously along the outer wall structure 126. This design may cause the heating fluid to change directions, for example, axially along the central axis C and radially away from the central axis C. This feature may result in an "S" shape or pattern that can provide more surface area as compared to, for example, the linear or longitudinal shape of FIG. 3. In one implementation, the bore portion 138 may take on a circumferential route 142, which is shown here to circumscribe at least part of the central axis C, often in the form of a ring-like void or channel in the valve body 122. The design may also link or couple these channels together to allow continuous flow of heating fluid through the pathways 134. However, it is possible that any of the routes contemplated herein may represent individual pathways 134, as well.

Figure 5:
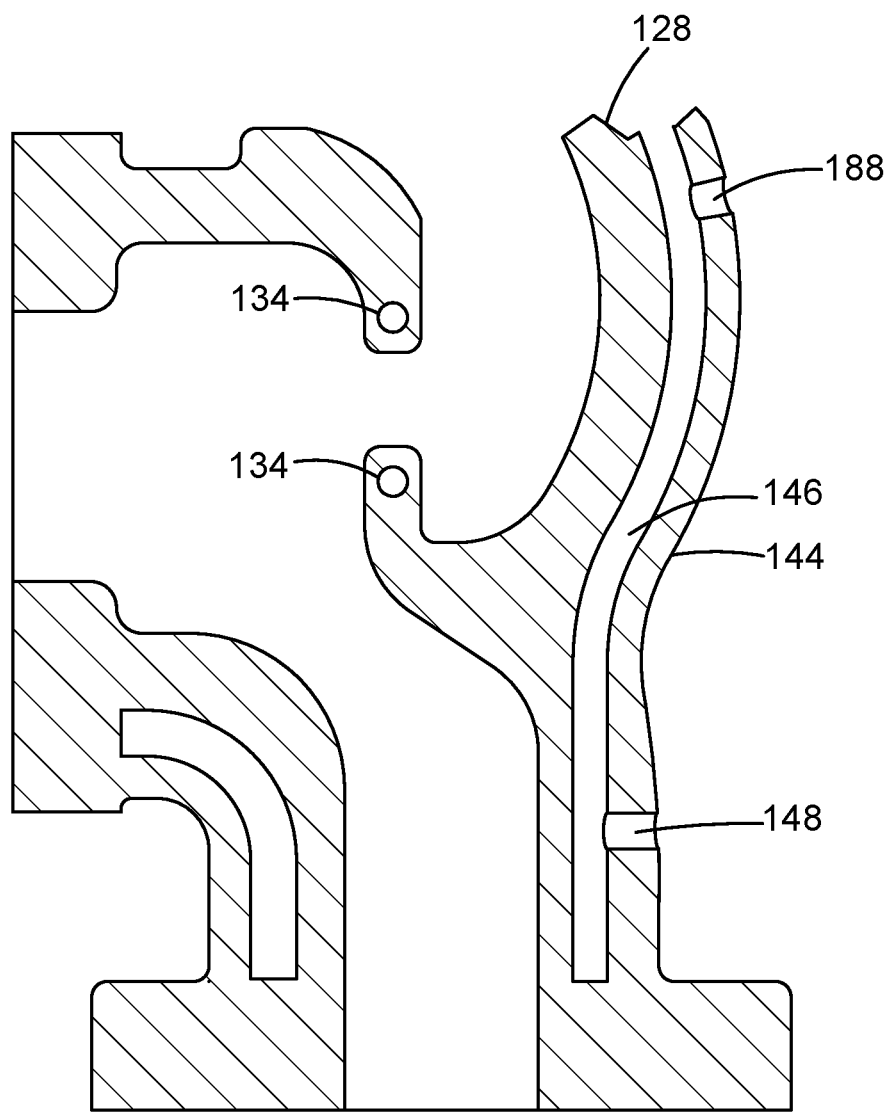
FIG. 5 depicts an elevation view of an example of the valve housing of FIG. 1.

FIG. 5 depicts an elevation view of the cross-section of an example of the heating unit 120 of FIG. 2. In this example, a second wall 144 can be formed integrally as part of the outer wall structure 126. The design may integrate a space or air gap 146 between the "inner" first wall 128 and the "outer" second wall 144. Ports 148 in the second wall 144 may allow the heating fluid to flow into the space 146 and in contact with the first wall 128. In one implementation, the second wall 144 may include pathways 134 to further distribute the heating fluid throughout the device. Additional pathways 134 may also reside in locations proximate parts of the device, for example, in proximity to the closure member 116 or the seat 118. Additive manufacturing may allow for the walls 128, 144 to form integrally with one another as a "joint-less" manufacture. This feature may avoid welds or fasteners that may require various post processing practices that are time or labor intensive. In one implementation, this technique may provide walls 128, 144 material compositions that are the same or effectively homogenous with another as well.

In view of the foregoing, the proposed design can maintain temperature of valves or valve parts in critical conditions. The improvements may avoid changes in part "envelope" because features necessary to carry heated fluid or steam are integral with the underlying part, typically the valve body. This feature avoid the need for ancillary parts, like heated blankets, in the field. It also permits use of more of the valve body as area (or volume) to distribute heat, for example, to the closure member or seat.

The examples below include certain elements or clauses to describe embodiments contemplated within the scope of this specification. These elements may be combined with other elements and clauses to also describe embodiments. This specification may include and contemplate other examples that occur to those skilled in the art. These other examples fall within the scope of the claims, for example, if they have structural elements that do not differ from the literal language of the claims, or if they include equivalent structural elements with insubstantial differences from the literal language of the claims.

What is claimed is:

1. A valve, comprising:
    an actuator;
    a closure member coupled with the actuator; and
    a one-piece valve body enclosing the closure member, the one-piece valve body having a main flow path with a central axis and a single first wall with a secondary flow path disposed therein,
    wherein the secondary flow path has a main bore portion that forms a circuitous route in the wall with at least two, connected portions that are parallel with each other and that are parallel with the central axis so as to create continuous flow of fluid in a first direction along the central axis and in a second direction along the central axis that is opposite of the first direction.

2. The valve of claim 1, wherein the secondary flow path terminates at ports disposed in the single first wall.

3. The valve of claim 1, wherein the secondary flow path terminates at ports disposed in flanges on at least one end of the valve body.

4. The valve of claim 1, wherein the circuitous route forms an S shape.

5. The valve of claim 1, wherein the main bore portion at least partially circumscribes the central axis.

6. The valve of claim 1, wherein the single first wall forms a surface of the main flow path.

7. The valve of claim 1, further comprising a ring-like void that circumscribes the central axis.

8. The valve of claim 1, wherein the one-piece valve body is manufactured using additive manufacturing.

9. A valve, comprising:
    an actuator;
    a closure member coupled with the actuator;
    a seat disposed proximate the closure member; and
    a one-piece valve body enclosing both the seat and the closure member, the one-piece valve body having a main flow path with a central axis and a single first wall with channels that can retain fluid therein, wherein the channels have at least two, connected portions that are parallel with each other and that are parallel with the central axis so as to create continuous flow of fluid in a first direction along the central axis and in a second direction along the central axis that is opposite of the first direction.

10. The valve of claim 9, wherein the channels are disposed proximate the closure member.

11. The valve of claim 9, wherein the channels are disposed proximate the seat.

12. The valve of claim 9, wherein the channels are disposed so as to affect temperature of the closure member.

13. The valve of claim 9, wherein the channels are disposed so as to affect temperature of the seat.

14. The valve of claim 9, further comprising a ring-like void that circumscribes the central axis.

15. The valve of claim 9, wherein the one-piece valve body is manufactured using additive manufacturing.

16. A valve, comprising:

an actuator;

a closure member coupled with the actuator;

a one-piece valve body enclosing the closure member, the one-piece valve body having a main flow path with a central axis and having openings disposed at either end, the one-piece valve body having a single first wall forming an interior surface defining the main flow path; and a second wall disposed on and surrounding the valve body, the second wall spaced apart from the single first wall so as to form an air gap therebetween, wherein the single first wall and the second wall are formed integrally as a joint-less manufacture, wherein the single first wall includes a secondary flow path in proximity to the closure member, and wherein the second wall includes ports that allow fluid into the air gap.

17. The valve of claim 16, wherein the single first wall and the second wall have a material composition that is the same.

18. The valve of claim 16, and wherein the second wall includes channels that retain fluid therein.

19. The valve of claim 16, wherein the one-piece valve body is manufactured using additive manufacturing.

20. The valve of claim 16, wherein the one-piece valve body is manufactured using additive manufacturing to form both the single first wall and the second wall with homogenous material composition.

* * * * *